US012577388B2

(12) United States Patent
Jang et al.

(10) Patent No.: US 12,577,388 B2
(45) Date of Patent: Mar. 17, 2026

(54) THERMOPLASTIC RESIN COMPOSITION AND MOLDED ARTICLE MANUFACTURED USING THE SAME

(71) Applicant: LG CHEM, LTD., Seoul (KR)

(72) Inventors: Seokgoo Jang, Daejeon (KR); Hyungseop Shim, Daejeon (KR); Ki Young Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 826 days.

(21) Appl. No.: 17/781,854

(22) PCT Filed: Jul. 15, 2021

(86) PCT No.: PCT/KR2021/009089

§ 371 (c)(1),
(2) Date: Jun. 2, 2022

(87) PCT Pub. No.: WO2022/085899

PCT Pub. Date: Apr. 28, 2022

(65) Prior Publication Data

US 2023/0032692 A1 Feb. 2, 2023

(30) Foreign Application Priority Data

Oct. 22, 2020 (KR) ........................ 10-2020-0137207
Jul. 12, 2021 (KR) ........................ 10-2021-0090772

(51) Int. Cl.
*C08L 51/00* (2006.01)

(52) U.S. Cl.
CPC ......... *C08L 51/003* (2013.01); *C08L 2201/10* (2013.01)

(58) Field of Classification Search
CPC .... C08F 220/14; C08F 212/08; C08F 220/44; C08L 51/04; C08L 2205/025;
(Continued)

(56) References Cited

U.S. PATENT DOCUMENTS 6,114,442 A 9/2000 Jung
7,417,088 B2 * 8/2008 Ahn ........................ G10L 19/10 525/85
(Continued)

FOREIGN PATENT DOCUMENTS

EP 3 037 474 A1 6/2016
EP 3 640 297 A2 4/2020
(Continued)

OTHER PUBLICATIONS

First Office Action dated Nov. 21, 2023 from the CNPA corresponding Chinese Patent Application No. 202180007199.9. Note: KR1020140041666, KR1020200099748, JP2002226655, JP198322139, JP2013227503 and KR1020010017970 cited therein is already of record.
(Continued)

*Primary Examiner* — Melissa A Rioja
*Assistant Examiner* — Devin Mitchell Darling
(74) *Attorney, Agent, or Firm* — Morgan, Lewis & Bockius LLP

(57) ABSTRACT

The present invention provides a thermoplastic resin composition including a first graft copolymer including a conjugated diene-based polymer, an alkyl (meth)acrylate-based monomer, an aromatic vinyl-based monomer, and a vinyl cyanide-based monomer; a second graft copolymer including an alkyl (meth)acrylate-based polymer, an aromatic vinyl-based monomer, a vinyl cyanide-based monomer, and an alkyl (meth)acrylate-based monomer; and a thermoplastic copolymer including an alkyl (meth)acrylate-based monomer, an aromatic vinyl-based monomer, and a vinyl cyanide-based monomer, wherein the first graft copolymer is included in an amount of 5 to 12% by weight, and the weight of the first graft copolymer is less than the weight of the second graft copolymer and at the same time less than the
(Continued)

weight of the thermoplastic copolymer, and a molded article manufactured using the thermoplastic resin composition.

14 Claims, 1 Drawing Sheet

(58) Field of Classification Search
CPC ...... C08L 2205/03; C08L 33/12; C08L 55/02; C08L 71/02
See application file for complete search history.

(56) References Cited

U.S. PATENT DOCUMENTS

| | | | |
|---|---|---|---|
| 2008/0242779 | A1 | 10/2008 | Gaggar et al. |
| 2013/0274416 | A1* | 10/2013 | Choi ........................ C08L 51/04 525/86 |
| 2014/0142212 | A1 | 5/2014 | Chu et al. |
| 2014/0186612 | A1 | 7/2014 | Kwon et al. |
| 2016/0002455 | A1 | 1/2016 | Chung et al. |
| 2017/0198132 | A1 | 7/2017 | Choi et al. |
| 2017/0342223 | A1 | 11/2017 | Han et al. |
| 2019/0062484 | A1* | 2/2019 | Jang ........................... C08F 2/44 |
| 2019/0119487 | A1* | 4/2019 | Michaelis De Vasconcellos ........ C08L 23/0869 |

FOREIGN PATENT DOCUMENTS

| | | | |
|---|---|---|---|
| JP | 850004384 | B | 2/1975 |
| JP | 853133254 | A | 11/1978 |
| JP | 858222139 | A | 12/1983 |
| JP | 2002-128984 | A | 5/2002 |
| JP | 2002-226655 | A | 8/2002 |
| JP | 2006-241283 | A | 9/2006 |
| JP | 2018-507921 | A | 3/2018 |
| KR | 10-0232625 | B1 | 12/1999 |
| KR | 10-2001-0017970 | A | 3/2001 |
| KR | 10-2009-0073453 | A | 7/2009 |
| KR | 10-2012-0070932 | A | 7/2012 |
| KR | 10-2014-0005510 | A | 1/2014 |
| KR | 10-2014-0041666 | A | 4/2014 |
| KR | 10-2016-0075415 | A | 6/2016 |
| KR | 10-2018-0052849 | A | 5/2018 |
| KR | 10-2019-0035005 | A | 4/2019 |
| KR | 10-2020-0076231 | A | 6/2020 |
| KR | 10-2020-0099748 | A | 8/2020 |
| KR | 10-2020-0104502 | A | 9/2020 |

OTHER PUBLICATIONS

First Office Action issued in corresponding Japanese Patent Application No. 2022-534806, dated Jun. 26, 2023. (KR 10-2018-0052849 and KR 10-2001-0017970 cited therein were cited in an earlier-filed SB08.).
Extended European Search Report issued in corresponding European Patent Application No. 21882973.7, dated Jun. 6, 2023. (KR 10-2018-0052849, KR 10-2016-0075415, and KR 10-2001-0017970 cited therein were cited in an earlier-filed SB08.).
International Search Report (partial translation) and Written Opinion issued in corresponding International Patent Application No. PCT/KR2021/009089, dated Oct. 25, 2021.
Office Action issued Sep. 6, 2023 for corresponding Korean Patent Application No. 10-2021-0090772. Note: KR 10-2014-0041666 cited therein is already of record.
Office Action dated Jan. 29, 2026 issued in the corresponding Indian Patent Application No. 202217040437.

* cited by examiner

[FIG. 1]
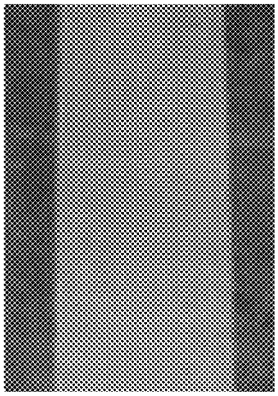
[FIG. 2]
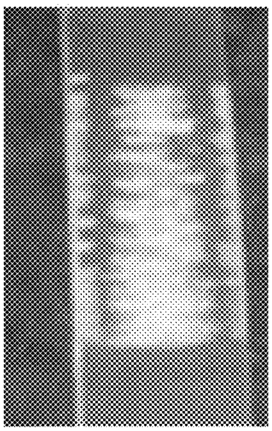

THERMOPLASTIC RESIN COMPOSITION AND MOLDED ARTICLE MANUFACTURED USING THE SAME

CROSS-REFERENCE TO RELATED APPLICATIONS

This application claims priority to Korean Patent Application No. 10-2020-0137207, filed on Oct. 22, 2020, and Korean Patent Application No. 10-2021-0090772, re-filed on Jul. 12, 2021, based on the priority of the above patent, in the Korean Intellectual Property Office, the disclosures of each of which are incorporated herein by reference.

TECHNICAL FIELD

The present invention relates to a thermoplastic resin composition and a molded article manufactured using the same. More particularly, the present invention relates to a thermoplastic resin composition capable of imparting excellent alcohol resistance, transparency, and processability to a product manufactured by molding the thermoplastic resin composition, and a molded article manufactured using the thermoplastic resin composition.

BACKGROUND ART

Vinyl cyanide compound-conjugated diene rubber-aromatic vinyl compound graft copolymers, which are acrylonitrile-butadiene-styrene (hereinafter referred to as "ABS-based") resins, have good processability and excellent impact strength, appearance, transparency, and color characteristics, and thus have been used in various fields, such as electronic equipment, office equipment, and household appliances.

However, these graft copolymers have poor alcohol resistance, which limits use thereof in the manufacture of parts requiring alcohol disinfection.

To improve alcohol resistance, a method of increasing rubber content or using expensive additives has been introduced. However, when rubber content is increased, a problem of reducing fluidity occurs. In addition, use of expensive additives adversely affects transparency.

Therefore, technology for preparing a thermoplastic resin composition having excellent alcohol resistance while ensuring transparency and processability needs to be developed.

RELATED ART DOCUMENTS

Patent Documents (Patent Document 1) KR 2016-0075415 A

DISCLOSURE

Technical Problem

Therefore, the present invention has been made in view of the above problems, and it is one object of the present invention to provide a thermoplastic resin composition that implements physical property balance between alcohol resistance, transparency, and processability.

It is another object of the present invention to provide a molded article manufactured using the thermoplastic resin composition.

The above and other objects can be accomplished by the present invention described below.

Technical Solution

In accordance with one aspect of the present invention, provided is a thermoplastic resin composition comprising:

a first graft copolymer comprising a conjugated diene-based polymer, an alkyl (meth)acrylate-based monomer, an aromatic vinyl-based monomer, and a vinyl cyanide-based monomer; a second graft copolymer comprising an alkyl (meth)acrylate-based polymer, an aromatic vinyl-based monomer, a vinyl cyanide-based monomer, and an alkyl (meth)acrylate-based monomer; and a thermoplastic copolymer comprising an alkyl (meth)acrylate-based monomer, an aromatic vinyl-based monomer, and a vinyl cyanide-based monomer, wherein, based on a total weight (% by weight) of the thermoplastic resin composition, the first graft copolymer is included in an amount of 5 to 12% by weight, and a weight of the first graft copolymer is less than a weight of the second graft copolymer and simultaneously less than a weight of the thermoplastic copolymer.

The thermoplastic resin composition may include 5 to 12% by weight of the first graft copolymer, 28 to 75% by weight of the second graft copolymer, and 20 to 60% by weight of the thermoplastic copolymer.

Based on a total weight of the first graft copolymer, the first graft copolymer may include 50 to 60% by weight of the conjugated diene-based polymer, 20 to 40% by weight of the alkyl (meth)acrylate-based monomer, 5 to 25% by weight of the aromatic vinyl-based monomer, and 1 to 15% by weight of the vinyl cyanide-based monomer.

The first graft copolymer may have a weight average molecular weight of 80,000 to 300,000 g/mol.

Based on a total weight of the second graft copolymer, the second graft copolymer may include 30 to 70% by weight of the alkyl (meth)acrylate-based polymer, 20 to 68% by weight of the aromatic vinyl-based monomer, 1 to 30% by weight of the vinyl cyanide-based monomer, and 1 to 15% by weight of the alkyl (meth)acrylate-based monomer.

The alkyl (meth)acrylate-based polymer of the second graft copolymer may include an alkyl (meth)acrylate-based monomer and an aromatic vinyl-based monomer, and the alkyl (meth)acrylate-based monomer of the alkyl (meth) acrylate-based polymer may be identical to the alkyl (meth) acrylate-based monomer of the second graft copolymer.

In this case, the alkyl (meth)acrylate-based monomer may be a butyl acrylate monomer or a 2-ethylhexyl acrylate monomer.

The second graft copolymer may have a weight average molecular weight of 50,000 to 150,000 g/mol.

A weight ratio of the first graft copolymer to the second graft copolymer may be 1:3 to 1:11.

Based on a total weight of the thermoplastic copolymer, the thermoplastic copolymer may include 40 to 75% by weight of the alkyl (meth)acrylate-based monomer, 15 to 40% by weight of the aromatic vinyl-based monomer, and 3 to 20% by weight of the vinyl cyanide-based monomer.

The alkyl (meth)acrylate-based monomer of the first graft copolymer and the alkyl (meth)acrylate-based monomer of the thermoplastic copolymer may be methyl methacrylate.

Based on 100 parts by weight in total of the first graft copolymer, the second graft copolymer, and the thermoplastic copolymer, the thermoplastic resin composition may include 1.5 parts by weight or less of a block copolymer comprising ethylene oxide units and propylene oxide units.

The thermoplastic resin composition may be used as a basic material with enhanced alcohol resistance.

In accordance with another aspect of the present invention, provided is a molded article manufactured using the above-described thermoplastic resin composition.

Advantageous Effects

A thermoplastic resin composition according to the present invention can implement excellent basic physical properties, such as mechanical rigidity and processability, and significantly improve alcohol resistance.

Accordingly, a molded article manufactured using the thermoplastic resin composition according to the present invention has alcohol resistance while maintaining basic physical properties, and thus can be applied to various fields, such as electronic equipment, office equipment, and household appliances, that require alcohol disinfection.

DESCRIPTION OF DRAWINGS

FIG. 1 is an image showing the surface of a chemical solvent-treated specimen according to Example 1.

FIG. 2 is an image showing the surface of a chemical solvent-treated specimen according to Comparative Example 2, showing that cracks occur on the surface of the specimen.

BEST MODE

Hereinafter, the present invention will be described in detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

In this description, a polymer comprising a certain compound means a polymer prepared by polymerizing the compound, and a unit in the polymer is derived from the compound.

In this description, unless specified otherwise, transparency refers to haze and color properties according to ASTM D1003.

When a resin or a resin composition has a transparency of 15% or less, it may be judged that the resin or the resin composition is a transparent resin or a transparent resin composition.

In this description, average particle diameter may be measured by dynamic light scattering. Specifically, the average particle diameter of a specimen in latex form may be measured in a Gaussian mode using a particle size distribution analyzer (Nicomp 380). In a particle size distribution measured by dynamic light scattering, an arithmetic average particle diameter may mean a scattering intensity average particle diameter.

As a specific measurement example, 0.1 g of prepared rubber latex (solids content: 35 to 50% by weight) is diluted with 100 g of distilled water to prepare a specimen, and the particle diameter of the specimen is measured at 23° C. using a particle size distribution analyzer (Nicomp CW380, PPS Co.) through dynamic light scattering. At this time, an intensity-weighted Gaussian analysis mode and an intensity value of 300 kHz are used. The average value of hydrodynamic diameters obtained from a scattering intensity distribution is obtained.

In this description, weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. Specifically, the weight average molecular weight is a weight average molecular weight (Mw) converted based on polystyrene by gel permeation chromatography (GPC, PL GPC220, Agilent Technologies).

Specifically, a sample is dissolved in a THF solution, and the weight average molecular weight of the sample is measured through gel permeation chromatography (GPC), and is obtained as a relative value to a polystyrene (PS) standard sample. Specific measurement conditions are as follows.

Solvent: tetrahydrofuran (THF)
Column temperature: 40° C.
Flow rate: 0.3 mL/min
Sample concentration: 20 mg/mL
Injection amount: 5 μl
Column model: 1× PLgel 10 μm MiniMix-B (250×4.6 mm)+1× PLgel 10 μm MiniMix-B (250×4.6 mm)+lx PLgel 10 μm MiniMix-B Guard (50×4.6 mm)
Equipment name: Agilent 1200 series system
Refractive index detector: Agilent G1362 RID
RI temperature: 35° C.
Data processing: Agilent ChemStation S/W
Test method: Measuring according to OECD TG 118

In this description, the composition ratio of a (co)polymer may mean the content of units constituting the (co)polymer, or may mean the content of units input during polymerization of the (co)polymer.

In this description, "content" means weight unless otherwise defined.

The present inventors confirmed that, when a thermoplastic resin composition was prepared by comprising a modified thermoplastic copolymer and two types of graft copolymers containing different rubber types, a transparent product having excellent alcohol resistance while ensuring processability could be provided. Based on these results, the present inventors conducted further studies to complete the present invention.

The thermoplastic resin composition according to one embodiment of the present invention includes a first graft copolymer comprising a conjugated diene-based polymer, an alkyl (meth)acrylate-based monomer, an aromatic vinyl-based monomer, and a vinyl cyanide-based monomer; a second graft copolymer comprising an alkyl (meth)acrylate-based polymer, an aromatic vinyl-based monomer, a vinyl cyanide-based monomer, and an alkyl (meth)acrylate-based monomer; and a thermoplastic copolymer comprising an alkyl (meth)acrylate-based monomer, an aromatic vinyl-based monomer, and a vinyl cyanide-based monomer.

The thermoplastic resin composition of the present invention includes such a composition. At the same time, the first graft copolymer is included in an amount of 5 to 12% by weight, and the weight of the first graft copolymer is less than the weight of the second graft copolymer and at the same time less than the weight of the thermoplastic copolymer. In this case, a molded article having excellent alcohol resistance, transparency, impact strength, and processability, which are desired effects, may be provided.

The thermoplastic resin composition of the present invention may be used as a basic material with enhanced alcohol resistance.

Hereinafter, each component of the thermoplastic resin composition of the present invention will be described in detail.

First Graft Copolymer

The thermoplastic resin composition of the present invention is preferably a transparent thermoplastic resin composition, and includes a first graft copolymer. The first graft copolymer includes a conjugated diene-based polymer, an alkyl (meth)acrylate-based monomer, an aromatic vinyl-based monomer, and a vinyl cyanide-based monomer.

The first graft copolymer may serve as an impact modifier in a thermoplastic resin molded article and may impart excellent transparency and processability to thermoplastic resin molded article.

The conjugated diene-based polymer may include a modified conjugated diene-based polymer prepared by graft-polymerizing an alkyl (meth)acrylate-based monomer, an aromatic vinyl-based monomer, and a vinyl cyanide-based monomer onto a conjugated diene-based polymer prepared by polymerizing a conjugated diene-based monomer.

In this description, the (meth)acrylate-based monomer includes both a methacrylate-based monomer and an acrylate-based monomer.

The conjugated diene-based polymer may have a structure in which a double bond and a single bond are arranged alternately. For example, the conjugated diene-based monomer may include one or more selected from 1,3-butadiene, isoprene, chloroprene, and piperylene, preferably 1,3-butadiene.

For example, based on a total weight of the first graft copolymer, the conjugated diene-based polymer may be included in an amount of 30 to 60% by weight, preferably 50 to 60% by weight. Within this range, the impact strength of a molded article manufactured using the thermoplastic resin composition of the present invention may be further improved.

For example, the conjugated diene-based polymer may have an average particle diameter of 0.1 to 0.5 μm, preferably 0.2 to 0.4 μm, more preferably 0.25 to 0.35 μm. Within this range, the mechanical properties of a molded article manufactured using the thermoplastic resin composition of the present invention may be further improved.

For example, the shell of the copolymer may have a weight average molecular weight of 80,000 to 300,000 g/mol, preferably 90,000 to 150,000 g/mol. Within this range, mechanical properties may be improved.

The shell of the copolymer may include an alkyl (meth)acrylate-based monomer, an aromatic vinyl-based monomer, and a vinyl cyanide-based monomer graft-polymerized onto a conjugated diene-based polymer.

For example, the alkyl (meth)acrylate-based monomer may be selected from methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate, and decyl (meth)acrylate. Preferably, the alkyl (meth)acrylate-based monomer is methyl (meth)acrylate.

For example, based on a total weight of the first graft copolymer, the alkyl (meth)acrylate-based monomer may be included in an amount of 20 to 40% by weight, preferably 25 to 35% by weight. Within this range, the transparency, rigidity, and scratch resistance of a molded article manufactured using the thermoplastic resin composition of the present invention may be further improved.

The aromatic vinyl-based monomer may include one or more selected from styrene, α-methylstyrene, α-ethylstyrene, and vinyltoluene, preferably styrene.

For example, based on a total weight of the first graft copolymer, the aromatic vinyl-based monomer may be included in an amount of 5 to 25% by weight, preferably 5 to 20% by weight, more preferably 5 to 15% by weight. Within this range, the rigidity and processability of a molded article manufactured using the thermoplastic resin composition of the present invention may be further improved.

The vinyl cyanide-based monomer may include one or more selected from acrylonitrile, methacrylonitrile, phenylacrylonitrile, and α-chloroacrylonitrile, preferably acrylonitrile.

For example, based on a total weight of the first graft copolymer, the vinyl cyanide-based monomer may be included in an amount of 1 to 15% by weight, preferably 1 to 10% by weight, more preferably 2 to 7% by weight. Within this range, the alcohol resistance, rigidity, and impact resistance of a molded article manufactured using the thermoplastic resin composition of the present invention may be further improved.

The first graft copolymer may be prepared by polymerizing an alkyl (meth)acrylate-based monomer, an aromatic vinyl-based monomer, and a vinyl cyanide-based monomer in the presence of a conjugated diene-based polymer using one or more methods selected from emulsion polymerization, suspension polymerization, and bulk polymerization, preferably emulsion polymerization.

For example, emulsion polymerization may be graft emulsion polymerization. For example, emulsion polymerization may be performed at a polymerization temperature of 50 to 85° C., preferably 60 to 80° C.

Emulsion polymerization may be performed in the presence of an initiator and an emulsifier.

The initiator is a radical initiator, and may include one or more selected from inorganic peroxides comprising sodium sulfate, potassium persulfate, ammonium persulfate, potassium superphosphate, and hydrogen peroxide; organic peroxides including t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutyrate; and azo compounds including azobis isobutyronitrile, azobis-2,4-dimethylvaleronitrile, azobis(cyclohexanecarbonylnitrile), and azobis isobutyric acid methyl.

In addition to the initiator, an activator may be further added to promote initiation reaction.

For example, the activator may include one or more selected from sodium formaldehyde sulfoxylate, sodium ethylenediamine tetraacetate, ferrous sulfate, dextrose, sodium pyrophosphate, anhydrous sodium pyrophosphate, and sodium sulfate.

For example, based on 100 parts by weight in total of the monomers and the conjugated diene-based polymer constituting the first graft copolymer, the initiator may be included in an amount of 0.001 to 1 part by weight, preferably 0.01 to 0.5 parts by weight, more preferably 0.02 to 0.1 parts by weight. Within this range, emulsion polymerization may be easily performed, and the remaining amount of the initiator in the first graft copolymer may be minimized to an amount of several tens of ppm.

For example, the emulsifier may include one or more selected from a potassium compound of alkylbenzene sulfonate, a sodium compound of alkylbenzene sulfonate, a potassium compound of alkyl carboxylate, a sodium compound of alkyl carboxylate, a potassium compound of oleic acid, a sodium compound of oleic acid, a potassium compound of alkyl sulfate, a sodium compound of alkyl sulfate, a potassium compound of alkyl dicarboxylate, a sodium compound of alkyl dicarboxylate, a potassium compound of alkyl ether sulfonate, a sodium compound of alkyl ether sulfonate, an ammonium compound of allyloxynonylphenoxypropane-2-yloxy methylsulfonate, and alkenyl $C_{16}$-$C_{18}$ succinic acid, dipotassium salt, preferably alkenyl $C_{16}$-$C_{18}$ succinic acid, dipotassium salt.

For example, based on 100 parts by weight in total of the monomers and the conjugated diene-based polymer constituting the first graft copolymer, the emulsifier may be included in an amount of 0.1 to 2.0 parts by weight, preferably 0.2 to 1.5 parts by weight, more preferably 0.3 to 1.0 part by weight. Within this range, emulsion polymerization may be easily performed, and the remaining amount of the initiator in the copolymer may be minimized to an amount of several tens of ppm.

When emulsion polymerization is performed, a molecular weight modifier may be further added. For example, the molecular weight modifier may include one or more selected from t-dodecyl mercaptan, n-dodecyl mercaptan, and an alpha-methylstyrene dimer, preferably t-dodecyl mercaptan.

For example, based on 100 parts by weight in total of the monomers and the conjugated diene-based polymer constituting the first graft copolymer, the molecular weight modifier may be included in an amount of 0.1 to 1 part by weight, preferably 0.2 to 0.8 parts by weight, more preferably 0.4 to 0.6 parts by weight.

The emulsion polymerization may be initiated after monomers and the like are fed into a reactor batchwise. Alternatively, some of monomers and the like may be fed into a reactor before start of emulsion polymerization, and the remainder may be continuously fed into the reactor after start of emulsion polymerization, or emulsion polymerization may be performed while continuously feeding monomers and the like for a certain period of time.

The obtained first graft copolymer may be in the form of latex, and may be recovered in a dried powder form through aggregation, dehydration, and drying processes.

As a coagulant used for aggregation, salts such as calcium chloride, magnesium sulfate, and aluminum sulfate, acidic substances such as sulfuric acid, nitric acid, and hydrochloric acid, and mixtures thereof may be used.

Based on a total weight of the thermoplastic resin composition, the first graft copolymer may be included in an amount of 5 to 12% by weight, preferably 5 to 10% by weight. When the above-described range is satisfied, a molded article manufactured by injecting the thermoplastic resin composition of the present invention may have excellent mechanical properties and transparency.

Second Graft Copolymer

The thermoplastic resin composition of the present invention is preferably a transparent thermoplastic resin composition, and includes the second graft copolymer. For example, the second graft copolymer includes an alkyl (meth)acrylate-based polymer, an aromatic vinyl-based monomer, a vinyl cyanide-based monomer, and an alkyl (meth)acrylate-based monomer.

The second graft copolymer may impart excellent impact resistance and alcohol resistance to a thermoplastic resin composition, and may impart compatibility between the above-described first graft copolymer and a thermoplastic copolymer to be described later.

The second graft copolymer may have a structure including a core and a shell.

The core may include a polymer prepared by polymerizing an alkyl (meth)acrylate-based monomer alone or a polymer prepared by polymerizing an alkyl(meth)acrylate-based monomer and an aromatic vinyl-based monomer.

The shell may be formed to surround the core, and may be prepared by polymerizing one or more selected from an aromatic vinyl-based monomer, a vinyl cyanide-based monomer, and an alkyl (meth)acrylate-based monomer.

For example, the shell of the copolymer may have a weight average molecular weight of 50,000 to 150,000 g/mol, preferably 60,000 to 130,000 g/mol. Within this range, impact resistance, processability, and transparency may be improved.

The second graft copolymer may be prepared by emulsion polymerization, suspension polymerization, or bulk polymerization, preferably emulsion polymerization.

The core of the second graft copolymer may be prepared by feeding the alkyl (meth)acrylate-based monomer continuously or batchwise and then performing emulsion polymerization, or by feeding the alkyl (meth)acrylate-based monomer and the aromatic vinyl-based monomer continuously or batchwise and then performing emulsion polymerization.

The shell of the second graft copolymer may be prepared by feeding one or more selected from the group consisting of an aromatic vinyl-based monomer, a vinyl cyanide-based monomer, and an alkyl (meth)acrylate-based monomer in the presence of the core continuously or batchwise and then performing emulsion polymerization.

The alkyl (meth)acrylate-based monomers included in the core and the shell may each independently include one or more selected from methyl (meth)acrylate, ethyl (meth) acrylate, propyl (meth)acrylate, butyl (meth)acrylate, 2-ethylhexyl (meth)acrylate, decyl (meth)acrylate, and lauroyl (meth)acrylate. A butyl acrylate monomer or a 2-ethylhexyl acrylate monomer may be used as the alkyl (meth)acrylate-based monomer.

For example, based on a total weight of the second graft copolymer, the alkyl (meth)acrylate-based polymer may be included in an amount of 30 to 70% by weight, preferably 40 to 60% by weight, more preferably 40 to 50% by weight. When the above-described range is satisfied, the impact strength, processability, and transparency of a molded article manufactured using the thermoplastic resin composition of the present invention may be further improved.

For example, when the alkyl (meth)acrylate polymer is prepared using an aromatic vinyl-based monomer and an alkyl (meth)acrylate-based monomer, based on a total weight of the alkyl (meth)acrylate polymer, the aromatic vinyl-based monomer may be included in an amount of 1 to 25% by weight, preferably 1 to 15% by weight. Within this range, the rigidity, processability, and transparency of a copolymer may be further improved.

For example, based on a total weight of the alkyl (meth) acrylate polymer, the alkyl (meth)acrylate-based monomer included in the alkyl (meth)acrylate polymer may be included in an amount of 70% by weight or more, preferably 70 to 99% by weight, more preferably 80 to 99% by weight, still more preferably 90 to 99% by weight. Within this range, the transparency, weather resistance, colorability, and alcohol resistance of a copolymer may be further improved.

Description of the aromatic vinyl-based monomer is the same as described in the first graft copolymer.

For example, based on a total weight of the second graft copolymer, the aromatic vinyl-based monomer may be included in an amount of 50% by weight or less, preferably 10 to 40% by weight, more preferably 20 to 40% by weight, still more preferably 3 to 40% by weight. Within this range, the rigidity, processability, and transparency of a copolymer may be further improved.

For example, the alkyl (meth)acrylate-based polymer may have an average particle diameter of 0.03 to 0.2 μm, preferably 0.05 to 0.17 μm, more preferably 0.05 to 0.12 μm. When the above-described range is satisfied, the mechanical properties and processability of a molded article manufactured using the thermoplastic resin composition of the present invention may be further improved.

For example, based on a total weight of the second graft copolymer, the alkyl (meth)acrylate-based monomer included in the shell may be included in an amount of 1 to 15% by weight, preferably 1 to 10% by weight. Within this range, the transparency, weather resistance, and colorability of a copolymer may be further improved.

For example, based on a total weight of the second graft copolymer, the aromatic vinyl-based monomer included in the shell may be included in an amount of 20 to 68% by weight, preferably 25 to 60% by weight, more preferably 30 to 55% by weight, most preferably 30 to 50% by weight. Within this range, the rigidity, processability, and transparency of a copolymer may be further improved.

Description of the vinyl cyanide-based monomer is the same as described in the first graft copolymer.

For example, based on a total weight of the second graft copolymer, the vinyl cyanide-based monomer may be included in an amount of 1 to 30% by weight, preferably 5 to 25% by weight, more preferably 10 to 20% by weight. Within this range, the rigidity, impact resistance, and alcohol resistance of a copolymer may be further improved.

For example, the second graft copolymer may be included in the thermoplastic resin composition in an amount of 28 to 75% by weight, preferably 30 to 60% by weight, more preferably 35 to 55% by weight. When the above-described range is satisfied, the transparency, alcohol resistance, mechanical properties, and processability of a molded article manufactured using the thermoplastic resin composition of the present invention may be further improved.

Thermoplastic Copolymer

The thermoplastic resin composition of the present invention is preferably a transparent thermoplastic resin composition, and includes a thermoplastic copolymer. The thermoplastic copolymer includes an alkyl (meth)acrylate-based monomer, an aromatic vinyl-based monomer, and a vinyl cyanide-based monomer.

The thermoplastic copolymer may be prepared by copolymerizing an alkyl (meth)acrylate-based monomer, an aromatic vinyl-based monomer, and a vinyl cyanide-based monomer.

Specifically, the thermoplastic copolymer may be prepared by feeding an alkyl (meth)acrylate-based monomer, an aromatic vinyl-based monomer, and a vinyl cyanide-based monomer continuously or batchwise and then performing polymerization using one or more methods selected from the group consisting of emulsion polymerization, suspension polymerization, and bulk polymerization.

For example, the alkyl (meth)acrylate-based monomer may be selected from methyl (meth)acrylate, ethyl (meth) acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate, and decyl (meth) acrylate. Preferably, the alkyl (meth)acrylate-based monomer is methyl (meth)acrylate.

For example, based on a total weight of the thermoplastic copolymer, the alkyl (meth)acrylate-based monomer may be included in an amount of 40 to 80% by weight, preferably 55 to 75% by weight. When the above-described range is satisfied, the transparency, scratch resistance, rigidity, processability, and impact resistance of a molded article manufactured using the thermoplastic resin composition of the present invention may be further improved.

Description of the aromatic vinyl-based monomer and the vinyl cyanide-based monomer is the same as described in the first graft copolymer.

For example, based on a total weight of the thermoplastic copolymer, the aromatic vinyl-based monomer may be included in an amount of 15 to 45% by weight, preferably 15 to 35% by weight. When the above-described range is satisfied, the rigidity and processability of a molded article manufactured using the thermoplastic resin composition of the present invention may be further improved.

For example, based on a total weight of the thermoplastic copolymer, the vinyl cyanide-based monomer may be included in an amount of 3 to 20% by weight, preferably 5 to 15% by weight. When the above-described range is satisfied, the impact resistance, rigidity, and alcohol resistance of a molded article manufactured using the thermoplastic resin composition of the present invention may be further improved.

For example, the thermoplastic copolymer may be included in the thermoplastic resin composition in an amount of 20 to 60% by weight, preferably 20 to 55% by weight. When the above-described range is satisfied, the mechanical properties of a molded article manufactured by injecting the thermoplastic resin composition of the present invention may be further improved.

The thermoplastic copolymer may be prepared by polymerizing an alkyl (meth)acrylate-based monomer, an aromatic vinyl-based monomer, and a vinyl cyanide-based monomer using one or more methods selected from emulsion polymerization, suspension polymerization, and bulk polymerization. For example, when bulk polymerization is used, manufacturing cost may be reduced, and mechanical properties may be excellent.

In the case of bulk polymerization, additives such as an emulsifier and a suspending agent are not added. Thus, a high-purity copolymer in which the content of impurities is minimized may be prepared. Accordingly, it may be advantageous to include a copolymer prepared by bulk polymerization in a thermoplastic resin composition for maintaining transparency.

For example, bulk polymerization may be a method in which an organic solvent as a reaction medium and, when necessary, additives such as molecular weight modifier and a polymerization initiator are added to a monomer mixture and polymerization is performed.

As a specific example, the method of preparing the thermoplastic copolymer may include a step of mixing 100 parts by weight of a monomer mixture comprising an alkyl (meth)acrylate-based compound, an aromatic vinyl compound, and a vinyl cyanide compound, 20 to 40 parts by weight of a reaction medium, and 0.05 to 0.5 parts by weight of a molecular weight modifier and performing polymerization at a reaction temperature to 130 to 170° C. for 2 to 4 hours.

Solvents commonly used in the art to which the present invention pertains may be used as the reaction medium without particular limitation. For example, aromatic hydrocarbon compounds such as ethylbenzene, benzene, toluene, and xylene may be used as the reaction medium.

For example, the method of preparing the thermoplastic copolymer may be performed using a continuous processing machine consisting of a raw material input pump, a continuous stirring tank into which reaction raw materials are continuously fed, a pre-heating tank for pre-heating a polymer solution discharged from the continuous stirring tank, a volatilization tank for volatilizing unreacted monomers and/or a reaction medium, a polymer transfer pump, and an extruder for preparing a polymer in the form of pellets.

In this case, extrusion may be performed at 210 to 240° C., without being limited thereto.

Thermoplastic Resin Composition

According to one embodiment of the present invention, when the weight of the above-described first graft copolymer is less than the weight of the second graft copolymer, physical property balance between transparency, impact strength, and processability in the thermoplastic resin composition may be secured, and alcohol resistance may be further improved.

The thermoplastic resin composition is preferably a transparent thermoplastic resin composition. When the weight of the above-described first graft copolymer is less than the weight of the thermoplastic copolymer, physical property balance between alcohol resistance, transparency, impact strength, and processability in the thermoplastic resin composition may be ensured.

In addition, in the thermoplastic resin composition, for example, the weight ratio of the first graft copolymer to the second graft copolymer (the first graft copolymer:the second graft copolymer) may be 1:3 to 1:11, preferably 1:4 to 1:10. When the above-described range is satisfied, the mechanical properties, processability, and alcohol resistance of a molded article manufactured using the thermoplastic resin composition of the present invention may be further improved.

The thermoplastic resin composition according to one embodiment of the present invention may include a block copolymer including ethylene oxide units and propylene oxide units. In this case, the block copolymer may serve as a processing aid for maintaining transparency.

For example, the block copolymer including ethylene oxide units and propylene oxide units may be a copolymer represented by Chemical Formula 1 below.

[Chemical Formula 1]

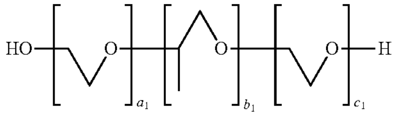

In Chemical Formula 1, a1 denotes an integer of 10 to 80, b1 denotes an integer of 10 to 50, and c1 denotes an integer of 10 to 80.

For example, in the copolymer represented by Chemical Formula 1, the content (corresponding to a1+c1 in Chemical Formula 1) of the ethylene oxide units derived from ethylene glycol may be 70 to 90 mol %, preferably 75 to 85 mol %.

For example, the block copolymer including ethylene oxide units and propylene oxide units may have a melting point of 30 to 90° C., preferably 30 to 80° C., more preferably 40 to 70° C. When the above-described range is satisfied, impact resistance, processability, and flame retardancy may be further improved.

In this description, melting point may be measured using a Brookfield viscometer according to a known method.

For example, the block copolymer including ethylene oxide units and propylene oxide units may have a surface tension of 80 mN/m or less, preferably 1 to 80 mN/m, more preferably 20 to 70 mN/m, still more preferably 30 to 60 mN/m as measured according to DIN 53814 (1 g/L in distilled water at 23° C.).

In addition, for example, the block copolymer including ethylene oxide units and propylene oxide units may be a copolymer having a weight average molecular weight of 5,000 to 30,000 g/mol, preferably 5,000 to 25,000 g/mol, more preferably 8,000 to 20,000 g/mol. When the above-described range is satisfied, compatibility with a base resin may be excellent, and thus elution of the polymer represented by Chemical Formula 1 may be prevented during processing and use.

For example, based on 100 parts by weight in total of the first graft copolymer, the second graft copolymer, and the thermoplastic copolymer, the block copolymer including ethylene oxide units and propylene oxide units may be included in an amount of 1.5 parts by weight or less, preferably 0.5 to 1.5 parts by weight, more preferably 1 to 1.5 parts by weight.

When the above-described range is satisfied, excellent transparency, impact resistance, and fluidity may be imparted to the thermoplastic resin composition.

For example, the thermoplastic resin composition may further include one or more selected from a heat stabilizer, a UV stabilizer, a lubricant, an antioxidant, a processing aid, a pigment, and a colorant.

For example, based on 100 parts by weight in total of the first graft copolymer, the second graft copolymer, and the thermoplastic copolymer, each of the additives may be included in an amount of 0.01 to 5 parts by weight, preferably 0.5 to 2 parts by weight, more preferably 1 to 2 parts by weight. Within this range, the intrinsic properties of the additives may be efficiently expressed without affecting the physical properties of the thermoplastic resin composition.

As another example, the additives may include a lubricant in an amount of 0.1 to 2 parts by weight, preferably 0.5 to 1.5 parts by weight and an antioxidant in an amount of 0.1 to 1 part by weight, preferably 0.1 to 0.5 parts by weight. Within this range, the intrinsic properties of the lubricant and the antioxidant may be efficiently expressed without affecting the physical properties of the thermoplastic resin composition.

Method of Preparing Thermoplastic Resin Composition

Hereinafter, a method of preparing the thermoplastic resin composition of the present invention will be described. In describing the method of preparing the thermoplastic resin composition of the present invention, all of the above-described thermoplastic resin composition is included.

For example, the method of preparing the thermoplastic resin composition of the present invention includes a step of feeding, into an extruder, a thermoplastic resin composition comprising a first graft copolymer comprising a conjugated diene-based polymer, an alkyl (meth)acrylate-based monomer, an aromatic vinyl-based monomer, and a vinyl cyanide-based monomer; a second graft copolymer comprising an alkyl (meth)acrylate-based polymer, an aromatic vinyl-based monomer, a vinyl cyanide-based monomer, and an alkyl (meth)acrylate-based monomer; and a thermoplastic copolymer comprising an alkyl (meth)acrylate-based monomer, an aromatic vinyl-based monomer, and a vinyl cyanide-based monomer and performing melt-kneading and extrusion, wherein the first graft copolymer is included in an amount of 5 to 12% by weight, and the weight of the first graft copolymer is less than the weight of the second graft copolymer and at the same time less than the weight of the thermoplastic copolymer.

For example, in the melt-kneading step, the above-described other additives may be included.

For example, the melt-kneading and extrusion step may be performed using one or more selected from a single-screw extruder, a twin-screw extruder, and a Banbury mixer. Preferably, the melt-kneading and extrusion step may be performed by uniformly mixing components using a twin-screw extruder and performing extrusion to obtain a thermoplastic resin composition in pellet form. In this case, mechanical properties, thermal properties, plating adhesion, and appearance may be excellent.

For example, the kneading and extrusion may be performed at a barrel temperature of 180 to 280° C., preferably 210 to 250° C. In this case, a throughput per unit time may be adequate, melt-kneading may be sufficiently performed, and thermal decomposition of resin components may be suppressed.

For example, the kneading and extrusion may be performed at a screw rotation rate of 200 to 300 rpm, preferably 250 to 300 rpm. In this case, a throughput per unit time may be adequate, process efficiency may be excellent, and kneading may be easily performed.

After extruding the thermoplastic resin composition, the prepared pellets may be dried, for example, at 60 to 90° C. for 4 hour or more in a convection oven, and then may be injection-molded.

The injection molding may be performed at an injection temperature 190 to 260° C., as a specific example, 210 to 230° C., a mold temperature of 40 to 80° C., as a specific example, 50 to 70° C., and an injection rate of 10 to 80 mm/sec, as a specific example, 20 to 40 mm/sec, using an injection molding machine (100 tons, ENGEL Co.).

Hereinafter, a molded article including the thermoplastic resin composition of the present invention will be described. In describing the molded article including the thermoplastic resin composition of the present invention, all of the above-described thermoplastic resin composition is included.

<Thermoplastic Molded Article>

According to another embodiment of the present invention, a molded article manufactured using the above-described transparent thermoplastic resin composition may be provided. Within the above-described range, mechanical properties and physical property balance between transparency, alcohol resistance, and processability may be improved.

For example, the molded article may be applied to various fields, such as electronic equipment, office equipment, and household appliances, that require alcohol disinfection.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, exemplary embodiments of the present invention are described in detail so as for those of ordinary skill in the art to easily implement the present invention. However, the present invention may be implemented in various different forms and is not limited to these embodiments.

EXAMPLES

Materials used in Examples and Comparative Examples below are as follows.

A) First graft copolymer (ABS-based resin: 50% by weight of a butadiene polymer having a (rubber) average particle diameter of 300 nm, 35% by weight of methyl methacrylate, 12% by weight of styrene, 3% by weight of acrylonitrile)

B-1) Second graft copolymer (ASA-based resin: 42% by weight of butyl acrylate having a (rubber) average particle diameter of 90 nm, 3% by weight of styrene, 37% by weight of styrene, 14% by weight of acrylonitrile, 4% by weight of butyl acrylate, weight average molecular weight: 85,000 g/mol)

B-2) Second graft copolymer (ASA-based resin: 42% by weight of butyl acrylate having a (rubber) average particle diameter of 90 nm and 3% by weight of styrene, 40% by weight of styrene and 15% by weight of acrylonitrile, weight average molecular weight: 83,000 g/mol)

C) Thermoplastic copolymer (MSAN resin prepared by bulk polymerization: 70% by weight of methyl methacrylate, 25% by weight of styrene, 5% by weight of acrylonitrile, weight average molecular weight: 150,000 g/mol)

D) Block copolymer comprising ethylene oxide units and propylene oxide units (Pluronic F108, weight average molecular weight: 14,600 g/mol, BASF Co.)

E) Methyl methacrylate polymer (IH830, weight average molecular weight: 101,000 g/mol, LG MMA Co.)

Examples 1 to 5, Comparative Examples 1 to 4, and Reference Examples 1 and 2

According to the contents shown in Tables 1 and 2 below, the components shown in Tables 1 and 2 were fed into a twin-screw extruder, and kneading and extrusion were performed at 230° C. to prepare pellets. The obtained pellets were injected at a molding temperature of 230° C. to prepare a specimen for measuring physical properties.

The properties of the pellets and the specimens prepared in Examples 1 to 5, Comparative Examples 1 to 4, and Reference Examples 1 and 2 were measured according to the following methods, and the results are shown in Tables 1 and 2 below.

Melt index (MI): Melt index was measured using the prepared pellets under conditions of 220 kg according to ASTM D1238.

Transparency (%): The haze and color properties of a specimen having a thickness of 3 mm were measured according to ASTM D1003.

Impact strength (Notched Izod impact strength, kg·cm/cm): The Notched Izod impact strength of a specimen having a thickness of 4 inches was measured according to ASTM D-256.

Alcohol resistance: After fixing a ⅛-inch (3.2 mm) thick tensile specimen to a jig (radius of curvature: 226.97 mm) having both ends bent, a 70% isopropyl alcohol-absorbed gaze was placed on the center of the specimen, and the specimen was allowed to stand for 12 hours to allow the isopropyl alcohol to permeate the specimen. Thereafter, change in the surface appearance of the specimen and the presence or absence of cracks on the surface of the specimen were observed with the naked eye. As a result, when there was no change, it was marked as "No Crack". When there was a slight crack and slight color change, it was marked as "Micro Crack". When cracks occurred and color change was severe, it was marked as "Crack".

In this description, unless otherwise defined, "%" means "% by weight".

TABLE 1

| Classification | Example 1 | Example 2 | Example 3 | Example 4 | Example 5 |
|---|---|---|---|---|---|
| A | 5 | 10 | 7 | 10 | 5 |
| B-1 | 50 | 35 | 43 | 50 | 50 |
| B-2 | — | — | — | — | — |
| C | 45 | 55 | 50 | 40 | 45 |
| D | — | 1 | 1 | 1 | 1.5 |
| E | — | — | — | — | |
| Melt index | 2.7 | 5.8 | 5.1 | 3.5 | 4.5 |
| Transparency | 12.5 | 11.6 | 11.2 | 14.6 | 12.5 |
| Impact strength | 13.5 | 10.9 | 11.7 | 16.9 | 13.3 |
| Alcohol resistance | No Crack | No Crack | No Crack | No Crack | No Crack |

(*The content of D is given in parts by weight based on 100 parts by weight in total of A, B-1, B-2, C, and E)

TABLE 2

| Classification | Comparative Example 1 | Comparative Example 2 | Comparative Example 3 | Comparative Example 4 | Reference Example 1 | Reference Example 2 |
|---|---|---|---|---|---|---|
| A | 43 | 10 | 15 | 3 | 5 | 5 |
| B-1 | 7 | 0 | 35 | 45 | 45 | 45 |
| B-2 | — | 50 | — | — | — | — |
| C | 50 | 40 | 50 | 52 | 50 | 40 |
| D | — | — | — | — | 2 | — |
| E | — | — | — | — | — | 10 |
| Melt index | 3.5 | 2.2 | 4.4 | 4.1 | 6.1 | 4.2 |
| Transparency | 4.6 | 75 | 16.3 | 9.3 | 9.5 | 8.9 |
| Impact strength | 27 | 17.8 | 13.8 | 8.5 | 10.5 | 11.5 |
| Alcohol resistance | Crack | No Crack | No Crack | No Crack | Micro Crack | No Crack |

(*The content of D is given in parts by weight based on 100 parts by weight in total of A, B-1, B-2, C, and E.)

As shown in Tables 1 and 2, compared to Comparative Examples 1 to 4 that use composition ranges outside the composition range of the present invention, or do not include the alkyl (meth)acrylate-based monomer in the shell of the second graft copolymer, in the case of Examples 1 to 5, in which the first graft copolymer, the second graft copolymer, and the thermoplastic copolymer are included in appropriate amounts, and the alkyl (meth)acrylate-based monomer included in the shell of the second graft copolymer is the same as the alkyl (meth)acrylate-based monomer used to prepare the alkyl (meth)acrylate polymer included in the second graft copolymer, chemical resistance represented by alcohol resistance is significantly improved while maintaining melt index, transparency, and impact strength equal or superior to those of Comparative Examples 1 to 4.

In particular, in the case of Comparative Example 1, in which the weight of the first graft copolymer is greater than the weight of the second graft copolymer, alcohol resistance is poor.

In addition, in the case of Comparative Example 2, in which the alkyl (meth)acrylate-based monomer is not included in the shell of the second graft copolymer, transparency is poor.

In addition, in the case of Comparative Example 3 including an excess of the first graft copolymer, transparency is reduced. In the case of Comparative Example 4 including the first graft copolymer in a small amount, impact strength is reduced.

In addition, referring to light microscope images shown in FIGS. 1 and 2 below, in the case of the molded article manufactured according to Example 1 of the present invention, no alcohol-induced cracks are observed. However, in the case of the molded article manufactured according to Comparative Example 1 outside the range of the present invention, due to the insufficient content of the second graft copolymer, cracks are observed, and alcohol resistance is poor.

In addition, in the case of Reference Example 1 including an excess of a processing aid, alcohol resistance and transparency, which are the main properties to be achieved in the present invention, are poor. In addition, although a methyl methacrylate polymer known to have excellent transparency is included, transparency is deteriorated depending on the content thereof.

In conclusion, by providing a thermoplastic resin composition including a modified thermoplastic copolymer and two types of graft copolymers having different rubber types in an appropriate composition ratio, a material having excellent alcohol resistance while having transparency and processability, which are basic physical properties, may be provided, and a molded article manufactured using the material may be provided.

The invention claimed is:

1. A thermoplastic resin composition, consisting of:
a first graft copolymer comprising:
a conjugated diene-based polymer as a core, and
a shell prepared by polymerizing:
a first alkyl (meth)acrylate-based monomer,
a first aromatic vinyl-based monomer, and
a first vinyl cyanide-based monomer;
a second graft copolymer comprising:
an alkyl (meth)acrylate-based polymer as a core, and
a shell prepared by polymerizing:
a second aromatic vinyl-based monomer,
a second vinyl cyanide-based monomer, and
a second alkyl (meth)acrylate-based monomer; and
a thermoplastic copolymer comprising:
a third alkyl (meth)acrylate-based monomer,
a third aromatic vinyl-based monomer, and
a third vinyl cyanide-based monomer,
wherein the thermoplastic resin composition comprises 5 to 12% by weight of the first graft copolymer, 28 to 75% by weight of the second graft copolymer, and 20 to 60% by weight of the thermoplastic copolymer,
wherein a weight ratio of the first graft copolymer to the second graft copolymer is 1:3 to 1:11, wherein, based on a total weight of the first graft copolymer, the first graft copolymer comprises 30 to 60% by weight of the conjugated diene-based polymer, 20 to 40% by weight of the alkyl (meth)acrylate-based monomer, 5 to 25% by weight of the aromatic vinyl-based monomer, and 1 to 15% by weight of the vinyl cyanide-based monomer, wherein, based on a total weight of the second graft copolymer, the second graft copolymer comprises 30 to 70% by weight of the alkyl (meth)acrylate-based polymer as the core, 20 to 68% by weight of the aromatic vinyl-based monomer, 1 to 30% by weight of the vinyl cyanide-based monomer, and 1 to 15% by weight of the alkyl (meth)acrylate-based monomer as the shell, and wherein the conjugated diene-based polymer have an average particle diameter of 0.2 to 0.4 μm, and wherein the alkyl (meth)acrylate-based polymer has an average particle diameter of 0.05 to 0.09 μm.

2. The thermoplastic resin composition according to claim 1, comprising:

5 to 10% by weight of the first graft copolymer.

3. The thermoplastic resin composition according to claim 1, wherein the first graft copolymer has a weight average molecular weight of 80,000 to 300,000 g/mol.

4. The thermoplastic resin composition according to claim 1, wherein the alkyl (meth)acrylate-based polymer comprises a fourth alkyl (meth)acrylate-based monomer and a fourth aromatic vinyl-based monomer, and the fourth alkyl (meth)=acrylate-based monomer is identical to the second alkyl (meth)acrylate-based monomer.

5. The thermoplastic resin composition according to claim 4, wherein the second alkyl (meth)acrylate-based monomer includes a butyl acrylate monomer or a 2-ethylhexyl acrylate monomer.

6. The thermoplastic resin composition according to claim 1, wherein the second graft copolymer has a weight average molecular weight of 50,000 to 150,000 g/mol.

7. The thermoplastic resin composition according to claim 1, wherein a weight ratio of the first graft copolymer to the second graft copolymer is 1:4 to 1:10.

8. The thermoplastic resin composition according to claim 1, wherein, based on a total weight of the thermoplastic copolymer, the thermoplastic copolymer comprises:

40 to 80% by weight of the third alkyl (meth)acrylate-based monomer, 15 to 40% by weight of the third aromatic vinyl-based monomer, and 3 to 20% by weight of the third vinyl cyanide-based monomer.

9. The thermoplastic resin composition according to claim 1, wherein the first alkyl (meth)acrylate-based monomer and the third alkyl (meth)acrylate-based monomer include methyl methacrylate.

10. The thermoplastic resin composition according to claim 1, further comprising 1.5 parts by weight or less of a block copolymer comprising ethylene oxide units and propylene oxide units, based on 100 parts by weight in total of the first graft copolymer, the second graft copolymer, and the thermoplastic copolymer.

11. The thermoplastic resin composition according to claim 1, wherein the thermoplastic resin composition is a basic material with alcohol resistance.

12. A molded article comprising the thermoplastic resin composition according to claim 1.

13. The thermoplastic resin composition according to claim 1, wherein the first alkyl (meth)acrylate-based monomer includes methyl methacrylate, the first aromatic vinyl-based monomer includes styrene, and the first vinyl cyanide-based monomer includes acrylonitrile.

14. A method of preparing a thermoplastic resin composition, comprising melt-kneading and extruding a thermoplastic resin composition consisting of:

a first graft copolymer comprising:

a conjugated diene-based polymer as the core, and a shell prepared by polymerizing:

a first alkyl (meth)acrylate-based monomer, a first aromatic vinyl-based monomer, and a first vinyl cyanide-based monomer;

a second graft copolymer comprising:

an alkyl (meth)acrylate-based polymer as a core, and a shell prepared by polymerizing:

a second aromatic vinyl-based monomer, a second vinyl cyanide-based monomer, and a second alkyl (meth)acrylate-based monomer; and a thermoplastic copolymer comprising a third alkyl (meth)acrylate-based monomer, a third aromatic vinyl-based monomer, and a third vinyl cyanide-based monomer, wherein the thermoplastic resin composition comprises 5 to 12% by weight of the first graft copolymer, 28 to 75% by weight of the second graft copolymer, and 20 to 60% by weight of the thermoplastic copolymer, wherein a weight ratio of the first graft copolymer to the second graft copolymer is 1:3 to 1:11, wherein, based on a total weight of the first graft copolymer, the first graft copolymer comprises 30 to 60% by weight of the conjugated diene-based polymer, 20 to 40% by weight of the alkyl (meth)acrylate-based monomer, 5 to 25% by weight of the aromatic vinyl-based monomer, and 1 to 15% by weight of the vinyl cyanide-based monomer, wherein, based on a total weight of the second graft copolymer, the second graft copolymer comprises 30 to 70% by weight of the alkyl (meth)acrylate-based polymer as the core, 20 to 68% by weight of the aromatic vinyl-based monomer, 1 to 30% by weight of the vinyl cyanide-based monomer, and 1 to 15% by weight of the alkyl (meth)acrylate-based monomer as the shell, and wherein the conjugated diene-based polymer have an average particle diameter of 0.2 to 0.4 μm, and wherein the alkyl (meth)acrylate-based polymer has an average particle diameter of 0.05 to 0.09 μm.

* * * * *